US012584865B2

(12) United States Patent
Lee et al.

(10) Patent No.:    US 12,584,865 B2
(45) Date of Patent:        Mar. 24, 2026

(54) DEFECT INSPECTION DEVICE AND METHOD FOR INSPECTING DEFECT

(71) Applicant: Samsung Display Co., LTD., Yongin-si (KR)

(72) Inventors: Jeong Moon Lee, Yongin-si (KR); Dae Hong Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 196 days.

(21) Appl. No.: 18/344,484

(22) Filed: Jun. 29, 2023

(65) Prior Publication Data

US 2024/0060904 A1      Feb. 22, 2024

(30) Foreign Application Priority Data

Aug. 22, 2022    (KR) ........................ 10-2022-0105041

(51) Int. Cl.
G01N 21/88          (2006.01)
G01N 21/95          (2006.01)

(52) U.S. Cl.
CPC ..... G01N 21/8851 (2013.01); G01N 21/8806 (2013.01); G01N 21/9501 (2013.01); *G01N 2021/8809* (2013.01); *G01N 2021/8874* (2013.01); *G01N 2021/8887* (2013.01)

(58) Field of Classification Search
CPC ... G01N 2021/8809; G01N 2021/8874; G01N 2021/8887; G01N 21/8806; G01N 21/8851; G01N 21/9501; G01N 2021/8854; G01N 21/95684; G06F 16/9535; G06F 16/9537; G06F 2216/11; G06Q 30/0283; G06Q 30/0619; G06Q 30/08; G06Q 50/10; G06Q 50/184
USPC ...................... 356/239.1–239.8, 237.1–237.6
See application file for complete search history.

(56) References Cited

U.S. PATENT DOCUMENTS

| | | | | |
|---|---|---|---|---|
| 5,710,631 A | * | 1/1998 | Bou-Ghannam ...... | G01N 21/88 356/516 |
| 6,617,603 B2 | * | 9/2003 | Ishiguro ................. | G01N 21/88 356/237.2 |
| 2016/0323475 A1 | * | 11/2016 | Kawasaki ............ | H04N 1/0473 |

FOREIGN PATENT DOCUMENTS

| | | | | |
|---|---|---|---|---|
| JP | 2005315792 A | * | 11/2005 | |
| JP | 5145066 B2 | * | 2/2013 | |
| JP | 2015503084 A | * | 1/2015 | |
| JP | 2018-091807 A | | 6/2018 | |
| KR | 10-0863140 B1 | | 10/2008 | |
| KR | 10-0880672 B1 | | 2/2009 | |

* cited by examiner

*Primary Examiner* — Tri T Ton
(74) *Attorney, Agent, or Firm* — Womble Bond Dickinson (US) LLP

(57) ABSTRACT

A defect inspection device according to one or more embodiments includes an inspection device for detecting a defect by line-scanning an object, and for generating review image data for the defect, a height measurer for acquiring a reference height of the defect and a height of the defect, and for generating height data of the defect, and a defect classifier for classifying the defect based on the review image data and the height data.

17 Claims, 7 Drawing Sheets

DEFECT INSPECTION DEVICE AND METHOD FOR INSPECTING DEFECT

CROSS-REFERENCE TO RELATED APPLICATION

This application claims priority to, and the benefit of, Korean Patent Application No. 10-2022-0105041 filed in the Korean Intellectual Property Office on Aug. 22, 2022, the entire contents of which are incorporated herein by reference.

BACKGROUND

1. Field

This disclosure relates to a defect inspection device and a method for inspecting a defect.

2. Description of the Related Art

An automated optical inspection (AOI) is an inspection method or an inspection device that optically captures an appearance of an object, and determines or predicts whether the object is defective via image processing using a computer. Electronic components or electronic devices, such as semiconductor packages, display panels, and printed circuit boards (PCBs) are manufactured through microprocessing, so a visual inspection thereof may be difficult. Automatic optical inspection (AOI) is a mechanical automation of exterior inspection work by applying an image processing technology.

Various defects, such as object cracks, dimensions, hole or via dimensions, conductor pitches, wiring sizes, device positions, flattening, poor soldering, foreign substances, singularities, etc. may be inspected through the automatic optical inspection (AOI).

After the defect inspection through the automatic optical inspection (AOI), it is possible to classify a defect occurrence, a type of the defect, a degree of the defect, etc. through automatic defect classification (ADC) using the review image. However, it may be difficult to distinguish the defects according to the height of the defect by the automatic optical inspection (AOI) and the automatic defect classification (ADC).

The above information disclosed in this Background section is only for enhancement of understanding of the background, and therefore it may contain information that does not form the prior art that is already known in this country to a person of ordinary skill in the art.

SUMMARY

Embodiments provide a defect inspection device and a method for inspecting a defect that may secure defect classification consistency by acquiring and adding height data of a defect without an additional process step.

A defect inspection device according to one or more embodiments includes an inspection device for detecting a defect by line-scanning an object, and for generating review image data for the defect, a height measurer for acquiring a reference height of the defect and a height of the defect, and for generating height data of the defect, and a defect classifier for classifying the defect based on the review image data and the height data.

The height measurer may be configured to measure the reference height by an autofocus method using optical triangulation, and may be configured to measure the height of the defect by a contrast detection autofocus method.

The height measurer may be configured to measure the reference height when the inspection device line-scans the object.

The height measurer may be configured to measure the height of the defect when the inspection device images the defect.

The inspection device may be configured to use an area scan camera to image the defect, wherein the height measurer is configured to use the area scan camera to detect a contrast of the defect.

The inspection device may include an inspection optical module for performing the line-scanning while moving in a scan direction, wherein the height measurer includes a measuring optical module for measuring the reference height, and wherein the measuring optical module is configured to move in the scan direction with the inspection optical module.

The measuring optical module may include a laser autofocus module.

The defect inspection device may further include a stage for supporting the object, and a gantry equipped with the inspection optical module and the measuring optical module.

The inspection device may constitute an automatic optical inspection system, wherein the defect classifier constitutes an automatic defect classification system.

The review image data may include 2D image data.

A method for an inspecting defect according to one or more embodiments includes detecting the defect by line-scanning an object, measuring a reference height of the defect, generating review image data by imaging the defect, measuring a height of the defect, generating height data of the defect for the reference height, and classifying the defect based on the review image data and the height data.

Measuring the reference height of the defect may include an autofocus method using an optical triangulation method, wherein measuring the height of the defect includes a contrast detection autofocus method.

Measuring the reference height may be performed during the line-scanning the object.

Measuring the height of the defect may be performed during imaging the defect.

The method may further include detecting a contrast of the defect using an area scan camera, wherein imaging the defect includes using the area scan camera.

The line-scanning the object may be performed while moving an inspection optical module in a scan direction, wherein measuring the reference height of the defect is performed by a measuring optical module moving with the inspection optical module in the scan direction.

Measuring the reference height of the defect may be performed by a laser autofocus module.

Detecting the defect may be performed by an automatic optical inspection system, wherein classifying the defect is performed by an automatic defect classification system.

The review image data may include 2D image data.

According to embodiments, it is possible to provide the defect inspection device and the method for inspecting the defect that may secure defect classification consistency by adding the height data of the defect. The height data of the defect may be acquired without additional processing, and as the defect classification accuracy is improved, unnecessary repair processes may be reduced, and process efficiency may be improved.

Also, unless otherwise stated, the embodiments may provide an effect that may be recognized throughout the specification.

DETAILED DESCRIPTION

Figure 1:
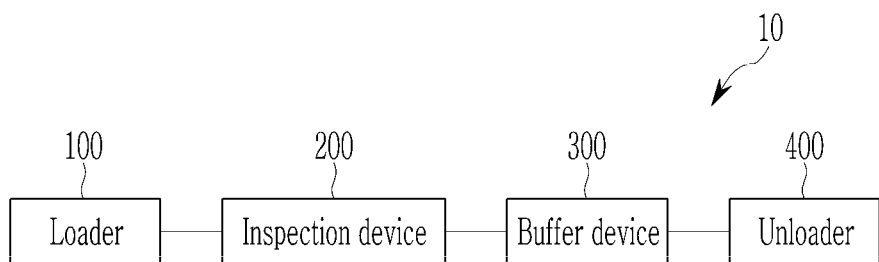
FIG. 1 is a block diagram schematically showing a defect inspection system according to one or more embodiments.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in different forms, and should not be construed as being limited to only the illustrated embodiments herein. Rather, these embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expression such as "at least one of A and B" and "at least one of A or B" may include A, B, or A and B. As used herein, "or" generally means "and/or," and the term "and/or" includes any and all combinations of one or more of the associated listed items. For example, the expression such as "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware, to process data or digital signals. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Circuit hardware may include, for example, application specific integrated circuits (ASICs), general purpose or special purpose central processing units (CPUs) that is configured to execute instructions stored in a non-transitory storage medium, digital signal processors (DSPs), graphics processing units (GPUs), and programmable logic devices such as field programmable gate arrays (FPGAs).

Further, the various components of these devices may be a process or thread, running on one or more processors, in one or more computing devices, executing computer program instructions and interacting with other system components for performing the various functionalities described herein. The computer program instructions are stored in a memory that may be implemented in a computing device using a standard memory device, such as, for example, a random-access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram schematically showing a defect inspection system according to one or more embodiments.

Referring to FIG. 1, a defect inspection system 10 may be a system that inspects a presence or absence of defects in an object, and that classifies the detected defects. For example, the defect inspection system 10 may be a system that distinguishes good objects from defective objects by inspecting whether there are defects in elements, wirings, layers, etc. included in the object. In addition, the defect inspection system 10 may be a system that may distinguish the type, the degree, and the like of the defect along with the presence or absence of the defect. The object, for example, may be a display panel that displays an image, or a substrate on which a transistor, a capacitor, wiring, an insulating layer, etc. are formed during the manufacturing process of the display panel. The object may be various electronic components, such as a printed circuit board (PCB), a semiconductor device, and a semiconductor package. In addition to process defects and device defects, the defects may include stains, dust, foreign particles, and contamination on the object.

The defect inspection system 10 may include a loader 100, a defect inspection device 200, a buffer device 300, an unloader 400, and the like.

The loader 100 may load the object to be inspected from a cassette in which the objects are accommodated, and may provide the object to the defect inspection device 200.

The defect inspection device 200 may perform a defect inspection process on the object provided from the loader 100. The defect inspection device 200 may inspect the loaded object, and may determine whether the object is defective according to the defect determination method, and may output the defect inspection result of the object. The defect inspection process, for example, may include scanning the object to detect the defect and to determine the type of the defect.

The buffer device 300 is located between the defect inspection device 200 and the unloader 400, and the object that has been inspected for the defect may be temporarily accommodated.

The unloader 400 classifies the object on which the defect inspection has been completed according to the defect inspection result output by the defect inspection device 200, and unloads the object to a subsequent process device or inspection device.

The defect inspection system 10 may further include a mechanical device such as a robot arm and a transfer belt for transferring the objects between devices.

Figure 2:
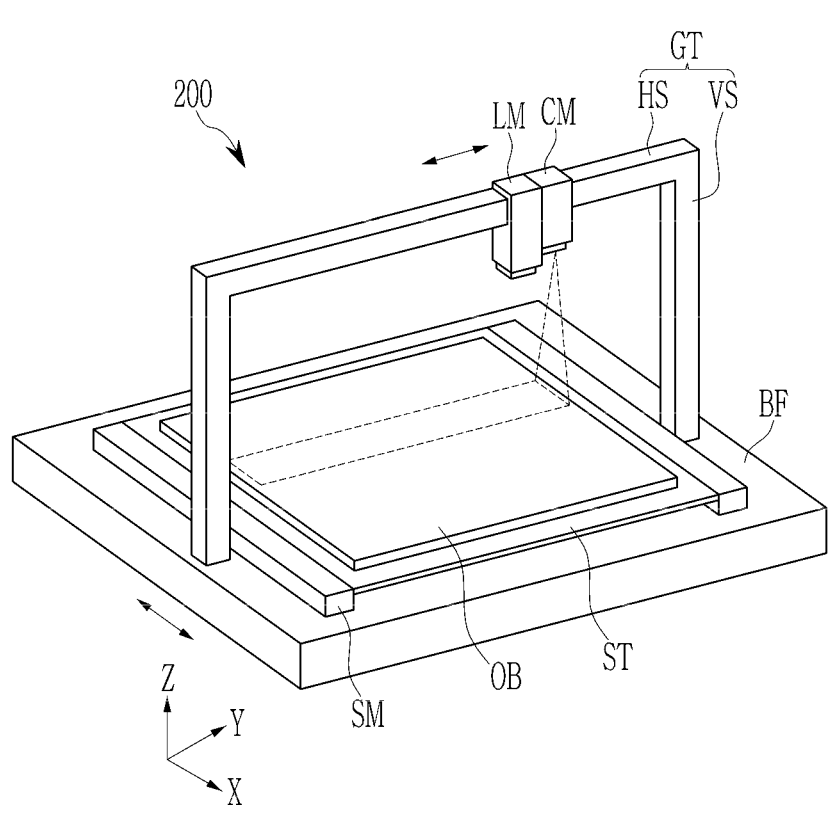
FIG. 2 is a perspective view schematically showing a defect inspection device according to one or more embodiments.

FIG. 2 is a perspective view schematically showing a defect inspection device according to one or more embodiments.

Referring to FIG. 2, the defect inspection device 200 may include a base frame BF, a stage ST, a stage mover (e.g., a stage movement unit) SM, an inspection optical module CM, a measuring optical module LM, a gantry GT, and the like.

The stage ST on which the object OB for the defect inspection is placed may be located on the base frame BF. The stage ST may be fixed by the stage mover SM. The stage mover SM may be installed on the base frame BF, and the stage ST may be moved by the stage mover SM. The stage mover SM may move the stage ST within a range (e.g., a predetermined range). For example, the stage mover SM may move the stage ST along the first direction X. The stage mover SM may be omitted, and may further include a mover/moving unit for moving the gantry GT along the first direction X.

The inspection optical module CM and the measuring optical module LM may be positioned to be spaced above the stage ST.

The inspection optical module CM may scan the object OB to detect any defect thereof. For example, the inspection optical module CM may line-scan the object OB along the second direction Y. The inspection optical module CM may generate an inspection image by line-scanning the object OB. The inspection optical module CM may generate a review image by imaging the defect region of the object OB. The defect inspection device 200 may acquire autofocus by detecting the contrast of the defect by using the inspection optical module CM, and may measure the height of the defect based on the acquired autofocus. For the line-scan, for the defect region imaging, for the contrast detection, and the like, the inspection optical module CM may include a light source and a sensor. The light emitted from the light source may be irradiated to the scan region of the object OB, and the sensor may detect the light reflected or scattered by the object OB. The inspection optical module CM may include a line-scan camera, an area scan camera, etc. as a sensor.

The measuring optical module LM may measure the reference height of the defect in the object OB by using the autofocus method using an optical triangulation method. The reference height may be a Z-axis height of the area adjacent to the defect of the object OB. To obtain the autofocus using the optical triangulation, the measuring optical module LM may include a light source and a sensor. For example, the measuring optical module LM may be a laser autofocus module. The measuring optical module LM may move along the second direction Y together with the inspection optical module CM.

The inspection optical module CM and the measuring optical module LM may be mounted on the gantry GT, and may be spaced apart from the stage ST by a distance (e.g., a predetermined distance). The gantry GT may include a horizontal supporter (e.g., a horizontal supporting unit) HS extending in the horizontal direction, and a vertical supporter (e.g., vertical supporting unit) VS extending in the vertical direction. The extension direction of the horizontal supporter HS may be substantially the same as the second direction Y, which is the scan direction of the inspection optical module CM. The horizontal supporter HS may provide a path to scan the object OB by mounting the inspection optical module CM. The inspection optical module CM and the measuring optical module LM may move along the second direction Y, which is generally the extension direction of the horizontal supporter HS. The inspection optical module CM and the measuring optical module may move together in the scan direction along the second direction Y while being adjacent to each other, or while having an interval (e.g., a predetermined interval) therebetween.

The defect inspection device 200 according to one or more embodiments is described in further detail with reference to FIG. 3.

Figure 3:
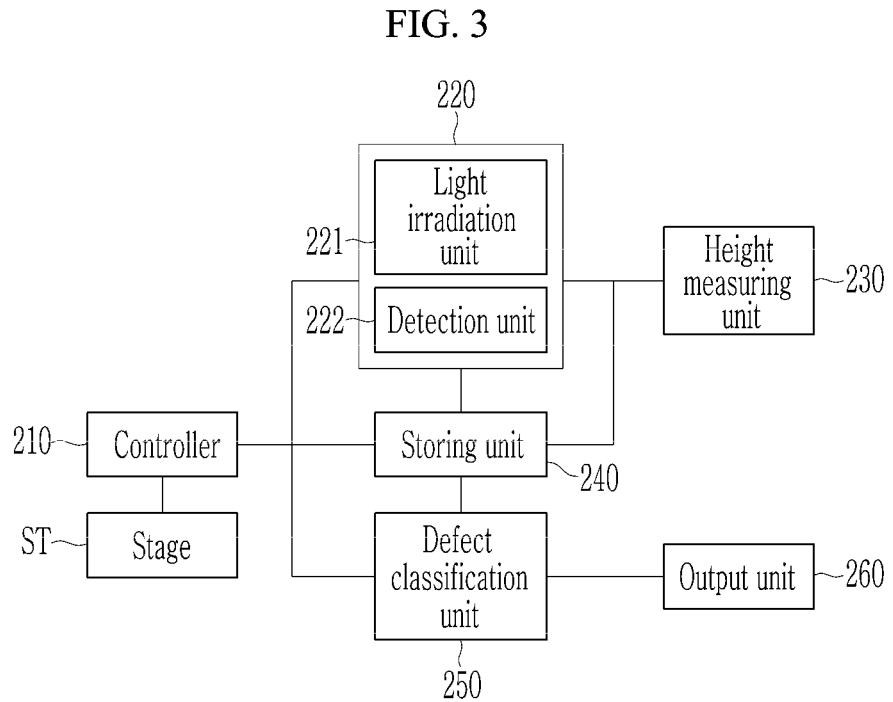
FIG. 3 is a block diagram schematically showing a defect inspection device according to one or more embodiments.

FIG. 3 is a block diagram schematically showing a defect inspection device according to one or more embodiments.

Referring to FIG. 3, the defect inspection device 200 may include a controller 210, an inspection device (e.g., inspection unit) 220, a height measurer (e.g., a height measuring unit) 230, a storage (e.g., storing unit) 240, a defect classifier (e.g., a defect classification unit) 250, an output (e.g., an output unit) 260, a stage ST, etc.

The controller 210 may control the movement of the stage ST. For example, the controller 210 may output a control signal instructing the stage ST to move in a corresponding direction to the stage ST. The controller 210 may control the operation of the inspection device 220. For example, when the object OB is loaded on the stage ST, the controller 210 may output the control signal for instructing the inspection device 220 to perform the operation of inspecting the object OB to the inspection device 220. The operation of the inspection device 220 may include inspecting the entire region of the object OB loaded in the stage ST. The operation of the inspection device 220 may include imaging a corresponding region of the object OB. The controller 210 may process data output from the inspection device 220. The controller 210 may control the operation of the defect inspection device 200 as a whole. The controller 210 may be hardware, such as an electronic controller (e.g., an electronic control unit (ECU)) or a microcontroller (e.g., micro control unit (MCU)), software executed in hardware, or a combination thereof. The controller 210 may be a computer, such as a personal computer.

The stage ST may support the object OB, which may be a display panel, for example. The shape of the stage ST may be a quadrangle, a circular plate, or the like. The stage ST may be movable in an X-Y plane or in an X-Y-Z space. For example, the stage ST may move along the first direction X, or may move along the first direction X and the second direction Y.

The inspection device 220 may inspect the defect existing in the object OB. The inspection device 220 may inspect the entire region of the object OB in a line-scan method. The inspection device 220 may receive the control signal of the controller 210 to irradiate light to the object OB loaded on the stage ST, and may acquire the inspection image from the reflected or scattered light from the object OB. The inspection device 220 may include an inspection optical module CM mounted on the gantry GT. The inspection device 220 may constitute an automatic optical inspection (AOI) system. The inspection device 220 may include a light irradiator (e.g., a light irradiation unit) 221 and a detector (e.g., a detection unit) 222. The light irradiator 221 and the detector 222 may be included in the inspection optical module CM.

The light irradiator 221 may irradiate light to the object OB. For example, the light irradiator 221 may be positioned above the stage ST on which the object OB is loaded to irradiate light toward the object OB. The light irradiator 221 may include a light source for irradiating a broadband light including ultraviolet rays to near infrared rays. The light irradiator 221 may include a laser light source, such as an argon ion laser or a helium-based laser. The light irradiator 221 may include an optical element (e.g., a lens, a beam splitter, etc.) that directs light emitted from the light source to the object OB.

The detector 222 may detect the light from the object OB, and may generate an output in response to the detected light. The light from the object OB may be light of which light irradiated by the light irradiator 221 is reflected or scattered by the object OB. The detector 222 may include any suitable detector. For example, the detector 222 may include a camera. The camera may include a line-scan camera using a time delay integration (TDI) method. The camera may include an area scan camera. The camera may include a charge-coupled device (CCD) or a complementary metal-oxide semiconductor (CMOS). A camera may include pixels, and the pixels may output gray values.

The detector 222 may capture an image of the object OB, and the captured image may include information on patterns (e.g., wiring, a semiconductor device, etc.) formed on the object OB. In the detector 222, the captured image may be a combination of gray values. The detector 222 may generate an inspection image by line-scanning the object OB. A line-scan camera may be used to create the inspection image.

The detector 222 may generate the review image for the defect by imaging the defect region detected in the object OB. The imaging of the defect regions for the generation of the review image may be performed using an area scan camera. The detector 222 may generate the review image data corresponding to the captured review image.

The controller 210 may detect the defect by processing the inspection image data generated by the detector 222 by scanning the object OB. For example, by comparing each gray value constituting the inspection image data generated by the detector 222 with the surrounding gray values, if the gray value is different from the repeated pattern period, it may be determined that there is a defect. Alternatively, the inspection device 220 may detect a defect by comparing the inspection image data generated by the detector 222 with reference image data. For example, when the defect exists in the object OB, the light irradiated by the light irradiator 221 is scattered by the defect, so the detector 222 may detect the scattered light, and may generate inspection image data that is different from the reference image data. The generated inspection image data may be stored in the storage 240. The controller 210 calculates the similarity between the inspection image data and the reference image data stored in the storage 240, and when the similarity is less than the reference similarity, it is possible to determine that the object OB has the defect, and to recognize a defect position.

The defect determination based on the inspection image data may be performed by the controller 210, but may also be performed by the inspection device 220 or the defect classifier 250.

The height measurer 230 may measure the height of the defect included in the object OB. The height measurer 230 may measure the height of the defect (e.g., a foreign material) with respect to the reference height. The height measurer 230 may measure the height of the defect by applying two autofocus methods. The height measurer 230 may measure the reference height in the object OB by the autofocus method using the optical triangulation method. The height measurer 230 may measure the height of the defect by using a contrast detection and autofocus method. The height measurer 230 may measure the height of the defect with respect to the reference height by subtracting the reference height from the height of the defect, and may calculate the height data.

For the autofocus method using the optical triangulation method, the height measurer 230 may include a laser autofocus module. The laser autofocus module may include a laser light source and a sensor. For example, the laser autofocus module may measure the Z-axis reference height of the defect from the object OB by projecting a laser line profile to the object OB by a laser light source, and by acquiring the displacement of the reflected beam by the sensor. The reference height measurement of the Z-axis may be performed during the object OB scan by the inspection device 220, for example. By using the optical triangulation method, the position of the object OB may be measured in real time.

For the contrast detection autofocus method, the height measurer 230 may include a camera. The camera may be an area scan camera. For example, the contrast of the defect may be measured with the image sensor while moving the lens group of the camera, and the height of the Z-axis of the defect may be calculated by acquiring the value at which the contrast is maximum. The height measurer 230 may measure the height by a contrast detection autofocus method by using the camera included in the detector 222. For example, when imaging the defect image by the detector 222, the Z-axis height of the defect may be measured by applying the contrast detection autofocus algorithm. That is, the Z-axis height of the defect may be measured with the autofocus value obtained by the contrast detection method by using the same area scan camera when the review image is captured by the area scan camera of the detector 222.

The storage 240 may store the review image data generated by the inspection device 220. The storage 240 may store the defect height data generated by the height measurer 230. The storage 240 may store the reference image data that is a reference for determining the defect. The data stored in the storage 240 may be managed by the controller 210.

The defect classifier 250 may configure an automatic defect classification (ADC) system based on image processing and a machine learning technique. The defect classifier 250 may classify the defect based on the review image data that is output from the inspection device 220 and based on the defect height data that is output from the height measurer 230. The defect information data that may be used for the classification of the defect may be stored in the storage 240, and the defect classifier 250 may classify the defect by comparing the defect information obtained from the review image data and the defect height data with the defect information data. The defect information data may be set by workers. The defect information data may be updated based on machine learning techniques.

The review image may be a 2D image. Therefore, when the defect is classified by the review image, distinguishing the defect according to the height or the thickness of the defect may be difficult because it may be suitable to classify the defect depending on the plane size, plane shape, and color of the defect. By adding the defect height data to the defect review image data, the defect classification consistency may be secured. In addition, because the height data of the defect may be acquired during the inspection by the inspection device 220, defect detection power may be improved without additional process steps, and ultimately the yield may be improved.

The output 260 may receive the data on the defect classification for the object OB from the defect classifier 250, and may display a defect inspection result. The output 260 may display the inspection status in real time.

Figure 4:
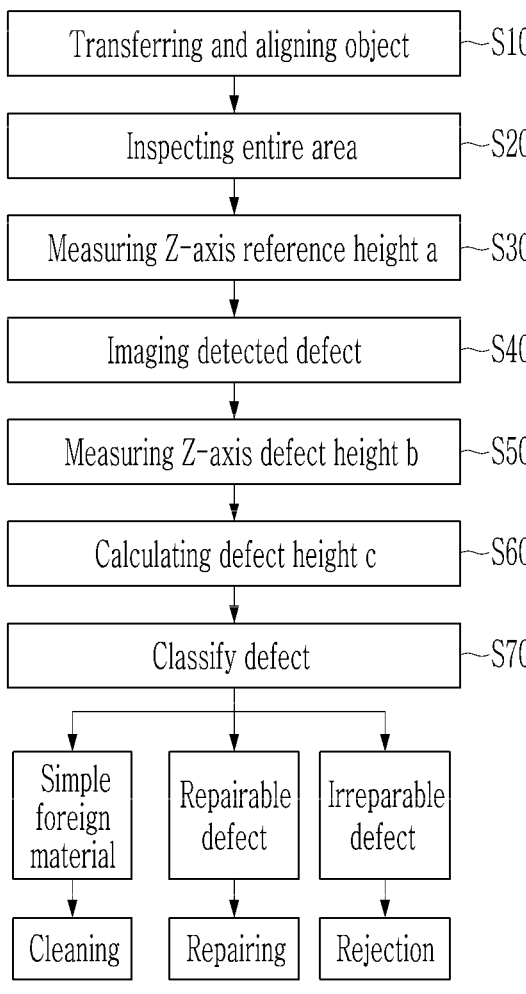
FIG. 4 is a flowchart showing a method for an inspecting defect according to one or more embodiments.
Figure 5:
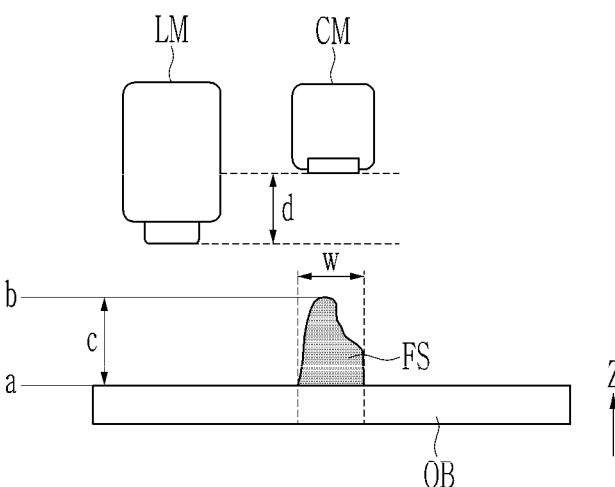
FIG. 5 is a schematic view showing a defect-height-measuring method according to one or more embodiments.
Figure 6:
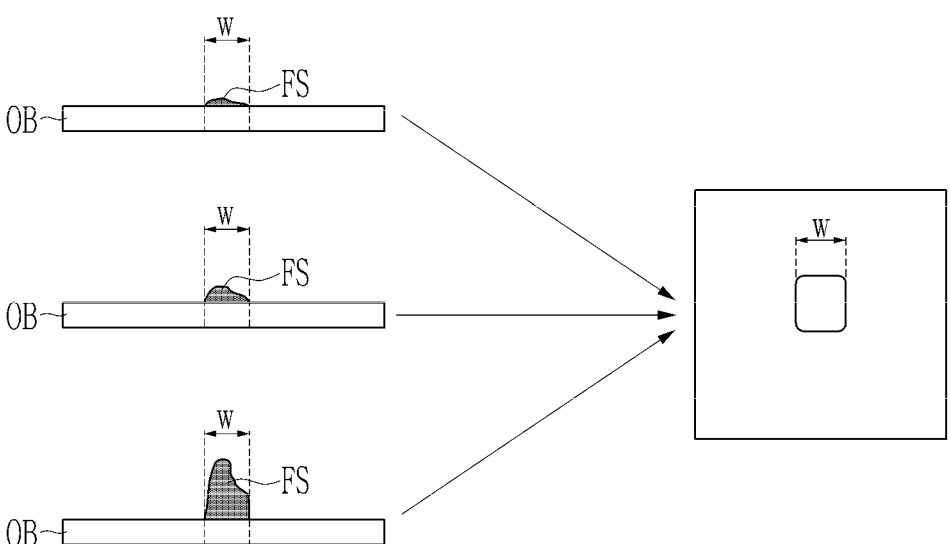
FIG. 6 is a schematic view showing a problem that occurs when a defect is classified only with a plan image of a defect.

FIG. 4 is a flowchart showing a method for an inspecting defect according to one or more embodiments. FIG. 5 is a schematic view showing a defect-height-measuring method according to one or more embodiments. FIG. 6 is a schematic view showing a problem that occurs when a defect is classified only with a plan image of a defect.

Referring to FIG. 4, the object OB subjected to the defect inspection may be transferred to the defect inspection device 200, and may be aligned to the defect inspection position (S10). In this case, the object OB may be placed on the stage ST.

The inspection device 220 of the defect inspection device 200 may detect the defect by inspecting the entire region of the object OB in the same way as a line-scan (S20). The defect may be detected by comparing gray values of the inspection images captured by a CCD camera. For example, by comparing the gray values composing the inspection image data with the surrounding gray values, if a pattern period in which the gray values are repeated is different, it may be determined that there is the defect. The gray values of the inspection image data may be compared with the line-scan, and the defects may be detected in real time.

Referring to FIG. 4 and FIG. 5, the height measurer 230 of the defect inspection device 200 may measure a Z-axis reference height a of the defect FS vicinity of the object OB (e.g., the position before and/or after the position of the defect FS of the object OB along the line-scan direction) (S30). The Z-axis reference height a may be acquired by using the measuring optical module LM during the line-scan inspection of the entire region of the object OB. The measuring optical module LM may be located adjacent to move together with the inspection optical module CM performing the line-scan inspection along the scan direction. The measuring optical module LM may acquire the autofocus in real time by the optical triangulation, and may quickly measure the Z-axis reference height a according to the scan speed. Therefore, no additional time or processing steps are required to obtain the Z-axis reference height a.

The inspection device 220 of the defect inspection device 200 may generate a review image for the defect FS by imaging the detected defect region by using the inspection optical module CM (S40). The generated review image may be converted into the review image data, and may be stored in the storage 240. The imaging of the defect region may be performed by a camera included in the inspection optical module CM. The review image data may be data including two-dimensional information of the defect FS, such as a plan shape and a width w of the defect FS.

The height measurer 230 of the defect inspection device 200 may measure the Z-axis height b of the defect FS. The Z-axis height b of the defect FS may be obtained by applying the contrast autofocus algorithm when imaging the defect region for generating the review image of the defect FS. Therefore, no additional device or process steps are required to obtain the Z-axis height b of the defect FS.

The height measurer 230 of the defect inspection device 200 may calculate the height c of the defect FS with respect to the reference height from the difference (e.g., b-a) between the Z-axis reference height a and the Z-axis height b of the defect FS (S60). The calculated height data may be stored in the storage 240. When calculating the height c of the defect FS for the reference height, an offset d between the inspection optical module CM and the measuring optical module LM may be considered and reflected.

The defect classifier 250 of the defect inspection device 200 may classify the defect FS based on the review image data and the height data stored in the storage 240. For example, if the defect FS is classified as a simple foreign material, a cleaning process may be performed to remove the defect FS. If the defect FS is classified as a repairable defect, the defect FS may be removed by performing a repair process (e.g., grinding, melting, etc.). If the defect FS is classified as an irreparable defect, it may be rejected without performing a process for removing the defect. By adding the height data to the review image data, which is two-dimensional data, accuracy may be improved in classifying the defect FS performed in the next process as described above.

When classifying the defect FS only with the review images without considering the height of the defect FS, the conformity of a step-level foreign material classification through the defect classifier 250 may be low. For example, referring to FIG. 6, it may be relatively difficult to distinguish the defect FS with a relatively large height, which may require repair, and the defect FS with a relatively low height, which might not require any repair. If the automatic defect classification (ADC) system to which machine learning is applied performs learning only with 2D images, it may be difficult to distinguish the defects according to the height of the defect FS. Therefore, because the repair process must be carried out for all defects FS suspected as a step foreign material, the amount of the repair process may increase. In addition, even for a defect FS that cannot be repaired because the step difference is too high, the repair process may be unnecessarily performed.

When classifying the defects through the automatic defect classification (ADC) by the defect classifier 250, by adding the height data of the defect FS, the classification consistency may be secured, and an unnecessary repair process may be avoided. In addition, it is possible to improve the machine learning method based on the 2D image and the Z-axis data during the automatic defect classification (ADC), and to secure the consistency of the modeling.

Hereinafter, the display panel that may be the object of the method for inspecting the defect according to one or more embodiments will be briefly described.

Figure 7:
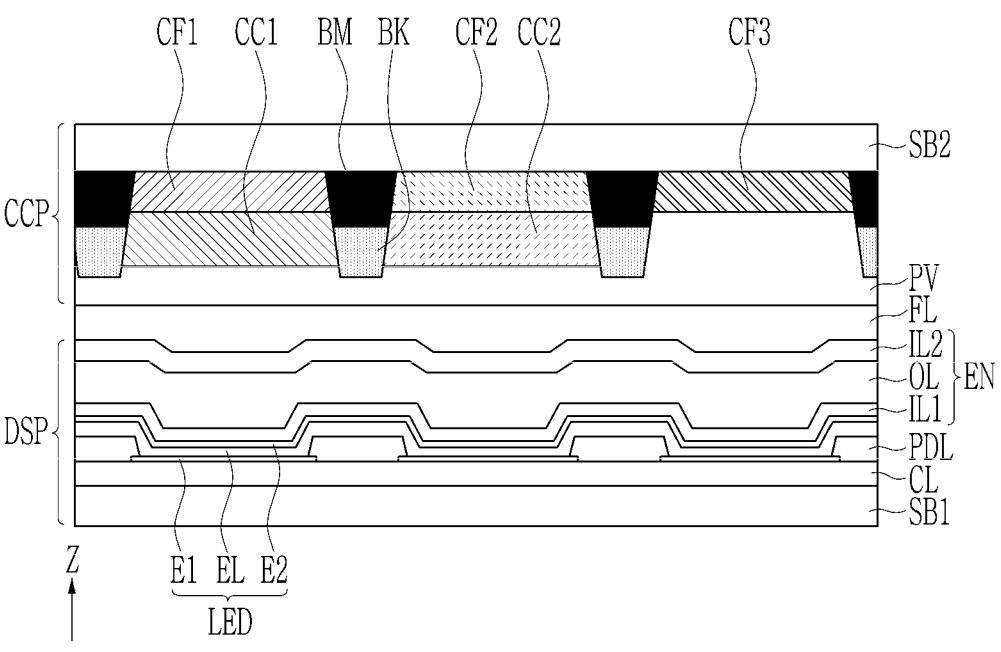
FIG. 7 is a cross-sectional view schematically showing a display panel according to one or more embodiments.

FIG. 7 is a cross-sectional view schematically showing a display panel according to one or more embodiments.

Referring to FIG. 7, the display panel according to one or more embodiments may include a display (e.g., a display unit) DSP, and a color converter (e.g., a color conversion unit) CCP positioned on the display DSP and/or facing the display DSP. The display DSP and the color converter CCP may be combined, or the color converter CCP may be laminated on the display DSP. A filling layer FL including a filling material may be positioned between the display DSP and the color converter CCP.

The display DSP may include a substrate SB1, and layers and elements positioned over substrate SB1. The substrate SB1 may include an insulating material, such as glass or plastic.

A circuit layer CL may be positioned on the substrate SB1. The circuit layer CL may include elements for driving the pixels of the display panel, such as transistors, capacitors, and wiring. In addition, the circuit layer CL may configure the elements or include insulating layers for forming elements or insulating between the elements. The elements may include a conductive layer that may include aluminum (Al), copper (Cu), titanium (Ti), molybdenum (Mo), and the like, and may include a semiconductor layer that may include polysilicon, amorphous silicon, an oxide semiconductor, and the like. The insulating layers consist of an inorganic insulating layer including an inorganic insulating material, such as a silicon oxide and/or a silicon nitride and/or an organic insulating layer including an organic insulating material, such as an imide-based polymer, an acryl-based polymer, and/or a siloxane-based polymer.

Light emitting diodes (LEDs) may be positioned on the circuit layer CL. The light-emitting diodes (LEDs) may constitute the pixels of the display panel. Each light-emitting diode (LED) may include a first electrode E1, an emission layer (EL) and a second electrode E2. Although three light-emitting diodes (LEDs) are shown, the display panel may include light-emitting diodes (LEDs) to match the resolution.

The first electrode E1 may be electrically connected to the transistor included in the circuit layer CL. The first electrode E1 may include a metal, such as silver (Ag), lithium (Li), calcium (Ca), aluminum (Al), magnesium (Mg), or gold (Au). The pixel conductive layer may include a transparent conductive oxide (TCO), such as an indium tin oxide (ITO) or an indium zinc oxide (IZO).

A pixel definition layer PDL may be positioned on the first electrode E1. The pixel definition layer PDL may have/ define an opening overlapping the first electrode E1. The pixel definition layer PDL may include an organic insulating material.

The emission layer EL may be positioned over the first electrode E1 and the pixel definition layer PDL. The emission layer EL may in contact with the first electrode E1 through the opening of the pixel definition layer PDL. Contrary to what is shown, the emission layer EL may be positioned within the aperture of the pixel definition layer PDL. The emission layer EL may include a light-emitting material that emits blue light. The emission layer EL may include a light-emitting material that emits red light or green light in addition to blue light. On the first electrode E1, in addition to the emission layer EL, at least one of a hole injection layer, a hole transport layer, an electron transport layer, and an electron injection layer may be positioned.

The second electrode E2 may be positioned on the emission layer EL. The second electrode E2 may include a metal, such as calcium (Ca), barium (Ba), magnesium (Mg), aluminum (Al), silver (Ag), platinum (Pt), palladium (Pd), gold (Au), nickel (Ni), neodymium (Nd), iridium (Ir), chromium (Cr), or lithium (Li). The second electrode E2 may include a transparent conductive oxide (TCO), such as an indium tin oxide (ITO) or an indium zinc oxide (IZO).

The first electrode E1 is provided individually for each pixel to receive a driving current. The second electrode E2 is provided in common to the pixels to receive a common voltage. The first electrode E1 may be referred to as a pixel electrode, and the second electrode E2 may be referred to as a common electrode. The first electrode E1 may be an anode of the light-emitting diode (LED), and the second electrode E2 may be a cathode of the light-emitting diode (LED).

An encapsulation layer EN may be positioned on the second electrode E2. The encapsulation layer EN may be a thin-film encapsulation layer including inorganic insulating layers IL1 and IL2 and an organic insulating layer OL.

The filling layer FL may be positioned on the encapsulation layer EN, and the color converter CCP may be positioned on the filling layer FL.

The color converter CCP may include a substrate SB2. The substrate SB2 may include an insulating material, such as glass or plastic.

A light-blocking member BM and color filter layers CF1, CF2, and CF3 may be positioned on the substrate SB2.

The light-blocking member BM may overlap the pixel defining layer PDL of the display DSP. The light-blocking member BM may be positioned so as to not overlap the aperture of the pixel defining layer PDL, which is the light-emitting region. The light-blocking member BM may be positioned between the neighboring color filter layers CF1, CF2, and CF3. The light-blocking member BM may include a black pigment or dye, and may reduce or prevent light reflection due to the metal layer of the display DSP. The light-blocking member BM may be referred to as a black matrix.

The color filter layers CF1, CF2, and CF3 may overlap the opening of the pixel defining layer PDL. The color filter layers CF1, CF2, and CF3 may include a red color filter layer CF1 that transmits red light, a green color filter layer CF2 that transmits green light, and a blue color filter layer CF3 that transmits blue light.

A partition wall BK may be positioned on the light-blocking member BM. The partition wall BK may overlap with the pixel definition layer PDL. The partition wall BK may partition the pixel area. The partition wall BK may include an organic insulating material. In the illustrated embodiment, the light-blocking member BM is positioned between the substrate SB2 and the partition wall BK, but the partition wall BK may be positioned between the substrate SB2 and the light-blocking member BM. In the illustrated embodiment, the color converter CCP may omit the light-blocking member BM, and in this case, the color filter layers CF1, CF2, and CF3 may overlap to provide a light-blocking region. An overlapping part of the color filter layers CF1, CF2, and CF3 may be positioned between the substrate SB2 and the partition wall BK.

Color conversion layers CC1 and CC2 may be positioned on the color filter layers CF1 and CF2. The color conversion layers CC1 and CC2 may be positioned in a space defined by the partition wall BK. The color conversion layers CC1 and CC2 may include a red color conversion layer CC1 and a green color conversion layer CC2. The red color conversion layer CC1 may overlap the red color filter layer CF1, and the green color conversion layer CC2 may overlap the green color filter layer CF2.

The red color conversion layer CC1 and the green color conversion layer CC2 may include different semiconductor nanocrystals. For example, blue light incident on the red color conversion layer CC1 may be converted into red light by the semiconductor nanocrystal included in the red color conversion layer CC1 and may be emitted. Blue light incident on the green color conversion layer CC2 may be converted into green light and may be emitted by the semiconductor nanocrystal included in the green color conversion layer CC2.

The semiconductor nanocrystal may include phosphors and/or quantum dots that convert incident blue light into red light or green light. Quantum dots may control a color phase of light emitted according to a particle size, and accordingly, the quantum dots may emit light of various colors, such as blue, red, and green.

On the blue color filter layer CF3, the transmission layer may or may not be positioned instead of the color conversion layers CC1 and CC2. The transmission layer may include a polymer material capable of transmitting blue light.

A passivation layer PV may be positioned on the color conversion layers CC1 and CC2. The passivation layer PV may include an inorganic insulating material or an organic insulating material.

While this disclosure has been described in connection with what is presently considered to be practical embodiments, it is to be understood that the present disclosure is not limited to the disclosed embodiments. On the contrary, it is intended to cover various modifications and equivalent arrangements included within the spirit and scope of the appended claims, with functional equivalents thereof to be included therein.

What is claimed is:

1. A defect inspection device comprising:
an inspection device having an inspection optical module for detecting a defect by line-scanning an object in a scan direction, and for generating review image data for the defect, the review image data corresponding to at least one of a plan shape or width of the defect;
a height measurer having a measuring optical module for acquiring a reference height of the defect and a height of the defect, and for generating height data of the defect, the height of the defect extending between a top of the defect and a bottom of the defect; and
a defect classifier for classifying the defect based on the review image data and the height data by using one or more machine learning techniques,
wherein the inspection optical module and the measuring optical module each comprise at least one light source and at least one sensor, and
wherein the measuring optical module is configured to concurrently move in the scan direction with the inspection optical module.

2. The defect inspection device of claim 1, wherein the height measurer is configured to measure the reference height by an autofocus method using optical triangulation, and is configured to measure the height of the defect by a contrast detection autofocus method.

3. The defect inspection device of claim 2, wherein the height measurer is configured to measure the reference height when the inspection device line-scans the object.

4. The defect inspection device of claim 2, wherein the height measurer is configured to measure the height of the defect when the inspection device images the defect.

5. The defect inspection device of claim 4, wherein the inspection device is configured to use an area scan camera to image the defect, and wherein the height measurer is configured to use the area scan camera to detect a contrast of the defect.

6. The defect inspection device of claim 1, wherein the measuring optical module comprises a laser autofocus module.

7. The defect inspection device of claim 1, further comprising:

a stage for supporting the object; and a gantry equipped with the inspection optical module and the measuring optical module.

8. The defect inspection device of claim 1, wherein the inspection device constitutes an automatic optical inspection system, and wherein the defect classifier constitutes an automatic defect classification system.

9. The defect inspection device of claim 1, wherein the review image data comprises 2D image data.

10. A method for inspecting a defect, the method comprising:

detecting the defect by line-scanning an object by moving an inspection optical module in a scan direction;

measuring a reference height of the defect by moving a measuring optical module concurrently with the moving of the inspection optical module in the scan direction;

generating review image data corresponding to at least one of a plan shape or width of the defect by imaging the defect;

measuring a height of the defect extending between a top of the defect and a bottom of the defect;

generating height data of the defect for the reference height; and classifying the defect based on the review image data and the height data by using one or more machine learning techniques, wherein the inspection optical module and the measuring optical module each comprise at least one light source and at least one sensor.

11. The method for inspecting the defect of claim 10, wherein measuring the reference height of the defect comprises an autofocus method using an optical triangulation method, and wherein measuring the height of the defect comprises a contrast detection autofocus method.

12. The method for inspecting the defect of claim 11, wherein measuring the reference height is performed during the line-scanning the object.

13. The method for inspecting the defect of claim 11, wherein measuring the height of the defect is performed during imaging the defect.

14. The method for inspecting the defect of claim 13, further comprising detecting a contrast of the defect using an area scan camera, wherein imaging the defect comprises using the area scan camera.

15. The method for inspecting the defect of claim 10, wherein measuring the reference height of the defect is performed by a laser autofocus module.

16. The method for inspecting the defect of claim 10, wherein detecting the defect is performed by an automatic optical inspection system, and wherein classifying the defect is performed by an automatic defect classification system.

17. The method for inspecting the defect of claim 10, wherein the review image data comprises 2D image data.

* * * * *